(No Model.) 3 Sheets—Sheet 1.

H. O'CONNELL & S. A. CAHILL.
LUBRICATOR.

No. 400,356. Patented Mar. 26, 1889.

Witnesses.
John F. Nelson
Lillie Hanna

Inventors.
Henry O'Connell
Stephen A. Cahill
By Knight Bros.
Attorneys.

(No Model.) 3 Sheets—Sheet 3.

H. O'CONNELL & S. A. CAHILL.
LUBRICATOR.

No. 400,356. Patented Mar. 26, 1889.

Witnesses.
John F. Nelson
Lillie Hanna

Inventors.
Henry O'Connell
Stephen A. Cahill
By Knight Bros.
Attorneys.

UNITED STATES PATENT OFFICE.

HENRY O'CONNELL AND STEPHEN A. CAHILL, OF MANISTEE, MICHIGAN.

LUBRICATOR.

SPECIFICATION forming part of Letters Patent No. 400,356, dated March 26, 1889.

Application filed August 2, 1888. Serial No. 281,812. (No model.)

*To all whom it may concern:*

Be it known that we, HENRY O'CONNELL and STEPHEN A. CAHILL, citizens of the United States, both residing at Manistee, county of Manistee, and State of Michigan, have invented certain new and useful Improvements in Lubricators, of which the following is a specification.

The object of our invention is the provision of mechanism whereby grease or other thick lubricants can be constantly applied to the working parts of an engine without the necessity of stopping the engine.

Our invention consists of certain details of mechanism, that will be first fully described with reference to the accompanying drawings, and then pointed out in the claims.

Figure 1:
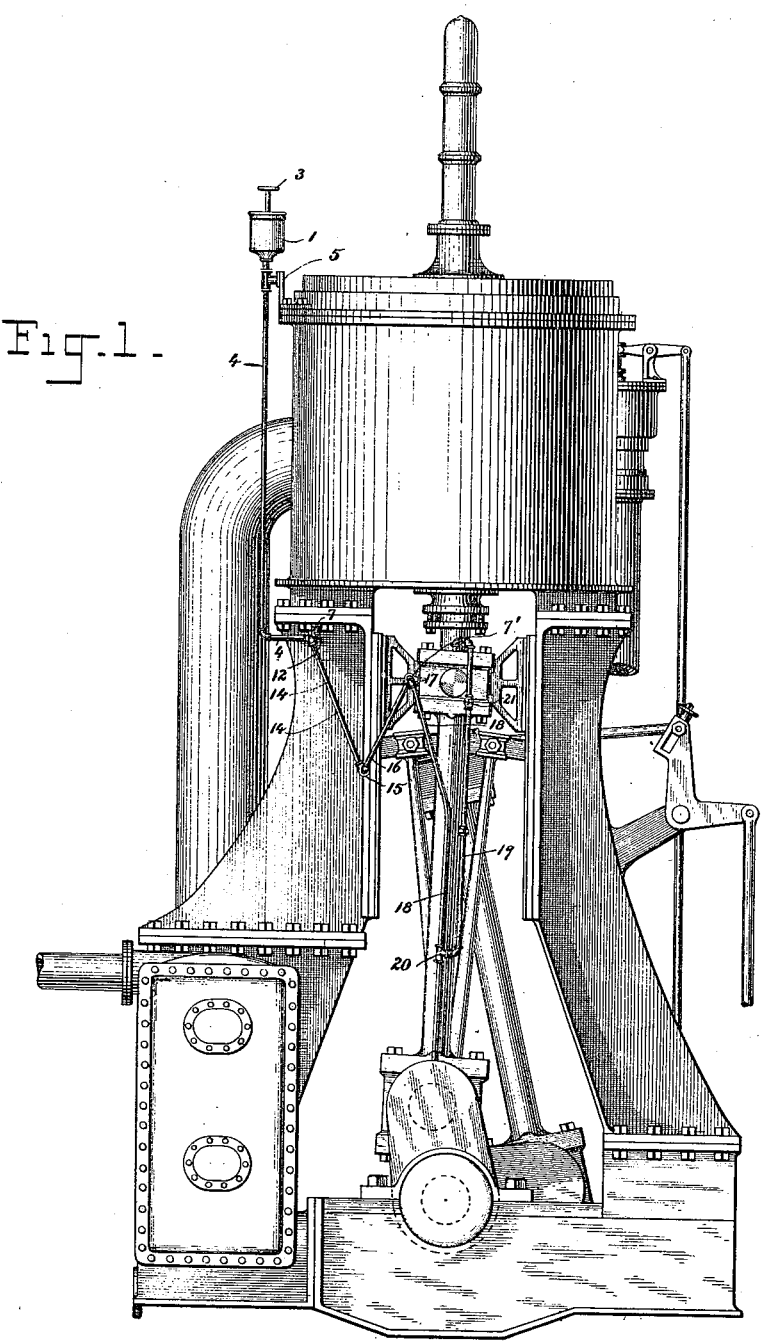
Figure 2:
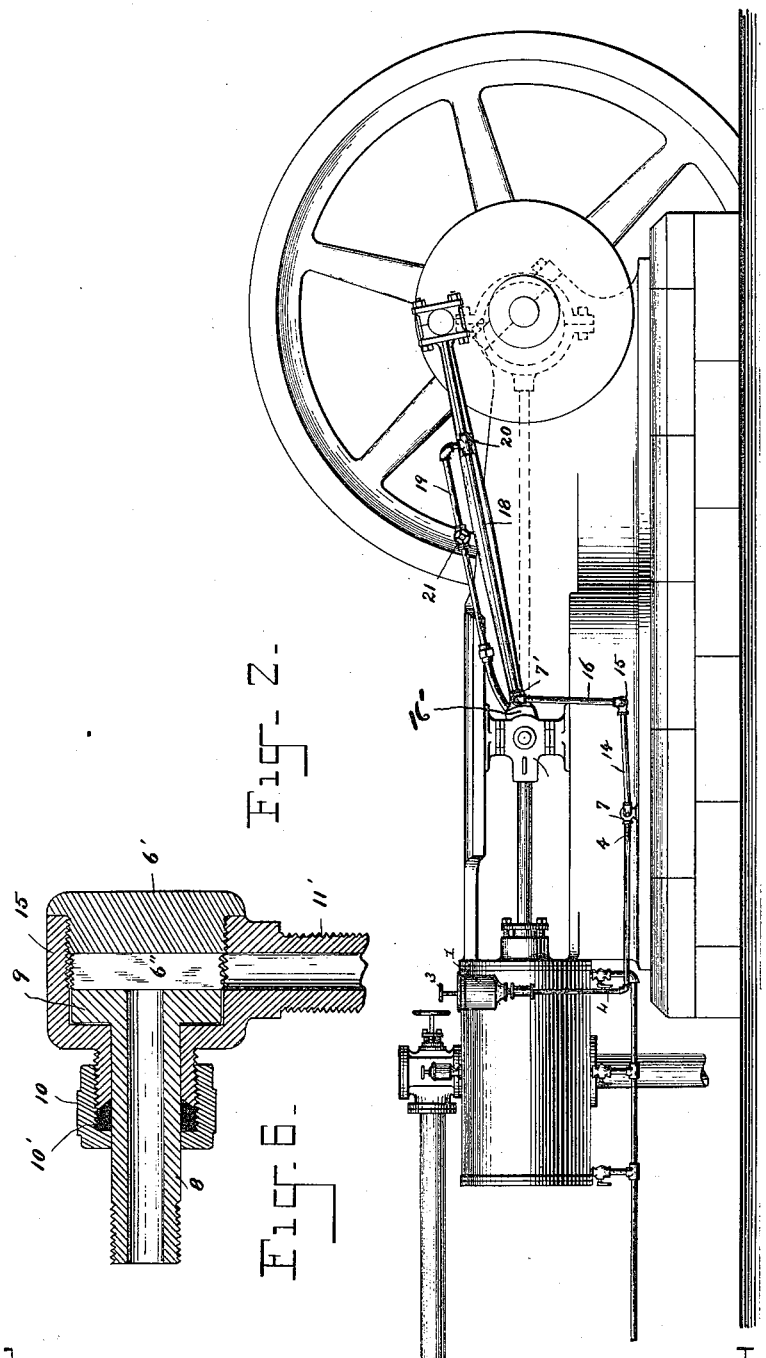
Figure 3:
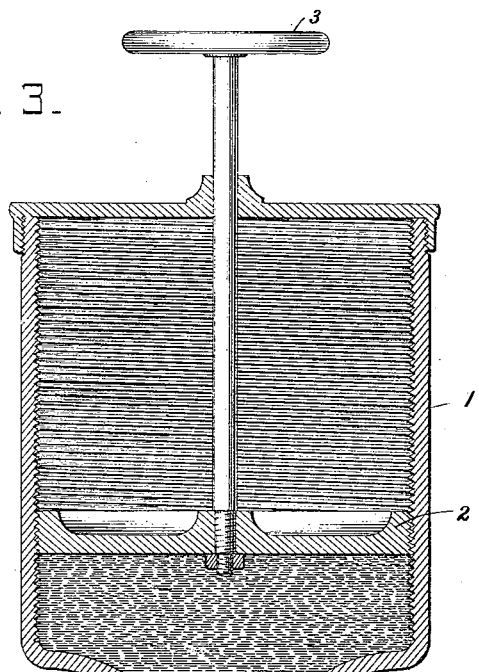
Figure 4:
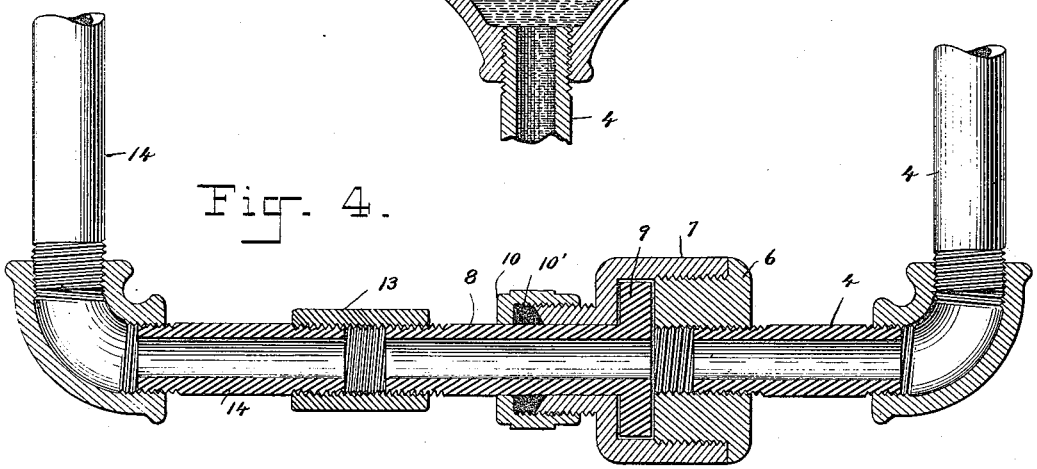
Figure 5:
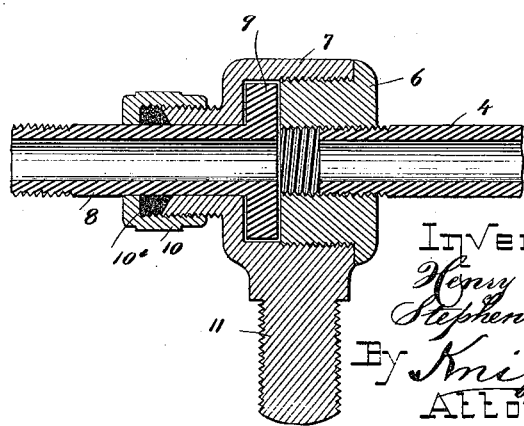

In said drawings, Figure 1 is an end view of a marine-engine to which our invention is applied. Fig. 2 is a similar view of a stationary horizontal engine to which our invention is applied. Fig. 3 is a vertical sectional view of a grease-cup which may be used with our invention. Fig. 4 is a sectional view of a stationary joint and a portion of the lubricating-pipes. Fig. 5 is a similar view in a plane at right angles to that of Fig. 4. Fig. 6 is a section of swing-joint.

Referring now to Fig. 1, which may represent any form of upright or marine engine, 1 is a grease-cup for feeding grease or other thick lubricant, and having back-pressure plunger or follower 2 and handle 3, Fig. 3, which can be turned when needed by the engineer or attendant to force down the lubricant.

4 is an externally-closed tube or pipe leading from the bottom or cup 1, supported by bracket 5 on the frame of the engine and serving for the support of cup 1. By the expression "externally closed," as applied to pipe 4, or, in fact, to the whole of my apparatus, is meant that the pipe or apparatus is not affected in its employment by the outer air. The lower end of pipe 4, as shown in Fig. 5, is screwed through a plug, 6, in the joint 7, which forms a bearing for the hollow spindle 8, held therein longitudinally by its flange 9. In Fig. 4 it will be seen that pipe 4 is made in two sections connected by an elbow-coupling. A continuous passage is thus obtained, a tight joint being insured by the packing-nut 10 and packing 10'. This joint is supported and rendered stationary by solid screw-threaded stud 11, which is secured to framework at a convenient point, 12.

A coupling or union, 13, connects the spindle 8 with pipe 14, which at its other end is coupled to the spindle 8 of swinging joint 15, (shown in Fig. 6,) to hollow stud 11' of which the pipe 16 is connected.

A solid plug, 6', with slotted inner end, 6'', serves to retain the spindle in position and at the same time afford a passage for the lubricating compound. Pipe 16 extends to the joint 7' upon the pin-strap 16' of the cross-head 17, and from thence pipe 18 to the crank-pin. A smaller pipe, 19, leads from the pipe 18 at 20 to the cross-head pin.

It will be seen that the mechanism will always swing and adjust itself through the rotary movement of the spindle in the joints to the motion of the engine or machine, affording a chain of pipe through which the lubricant is easily forced.

The object of the arrangement shown is to give the principal supply of lubricant to the crank-pin, leaving the cross-head pin, which does not need so much lubricant, to be supplied by any superabundance of pressure which may exist. It will be seen that by this means the grease-cup 1 is constantly in connection with both the crank-pin and the cross-head pin, and the attendant can without stopping the engine lubricate both of these parts by depressing the plunger in the grease-cup. The lubrication of both parts is always and directly under his control.

In Fig. 2 a similar arrangement is shown applied to a stationary horizontal engine. Similar parts are lettered the same as in Fig. 1, and, the operation being analagous, no extended description need be given of this form. A plug-valve, 21, in the pipe 19 may be employed to regulate, as desired, the supply of lubricant to the cross-head pin.

It will be observed that there is practically a continuous pipe extending from the grease-cup 1 to the moving parts of the engine which are to be lubricated, this pipe being flexible between the points of attachment to the stationary frame and to the moving member. So constructed, there is no change in the length of the pipe due to the movement of the cross-head. The apparatus is thus especially adapted for feeding solid lubricants, which have to be forced down by pressure applied to the material in the grease-cup. With such lubricants the extensible pipes, which have before been suggested for feeding oil to journals, will not work. The thick lubricant does not flow freely enough to adapt itself to the constantly changing length of a pipe in such apparatus.

Having thus described our invention, the following is what we claim as new therein and desire to secure by Letters Patent:

1. An apparatus for feeding thick lubricants to the moving parts of an engine, consisting of the combination of an externally-closed stationary grease-cup provided with a back-pressure plunger, an externally-closed pipe which communicates with said cup, and which has at opposite ends means of support on the stationary frame and on a moving part of the engine and flexible between such points of support, and a pipe or duct which communicates with the moving part to be lubricated, and which is connected to said flexible pipe at its point of support on the moving part of the engine, substantially as and for the purposes set forth.

2. In an apparatus for feeding thick lubricants to the moving member of an engine, the combination of a stationary externally-closed grease-cup having a pressure-plunger and externally-closed pipes 4 14 16, connected by hollow hinged joints with each other and with the grease-cup and moving member, respectively, substantially as set forth.

3. In an apparatus for feeding thick lubricants to the moving member of an engine, the combination of the following elements, to wit: a stationary externally-closed grease-cup, 1, having a pressure plunger or follower, 2, a hollow jointed pipe, 4, leading therefrom, a pipe, 14, connected with said pipe 4 by a hollow hinge adapted to allow the passage of the lubricant without atmospheric contact, and a pipe, 16, hinged at one end to the free end of the pipe 14 by hollow joint and adapted to be connected at its other end to the moving member to be lubricated, the said joint having on one side a stud to fasten it to one of said pipes, a spindle, 8, having a flange, 9, occupying said joint, and a plug for holding the said spindle within said joint, substantially as set forth.

4. In an apparatus for feeding thick lubricants to the moving members of the engine, the combination of an externally-closed stationary grease-cup having means of optional back-pressure, the pipe 4, connected with said cup by the hollow stationary joint 7, to which said pipe is connected, the pipe 14, hinged to said joint and having connection therethrough with said pipe 4, the pipe 16, connected to said pipe 14 by hollow hinged joint at one end and having its other end communicatively connected with pipe 18 by a hinged joint adapted to be mounted on and communicate with the engine cross-head pin-strap and lubricate the pin, as set forth.

5. In an apparatus for feeding thick lubricants to the moving members of an engine, the combination of the externally-closed stationary grease-cup 1, having a pressure follower or plunger, 2, hollow-jointed pipes 14 16, connected thereto and supported on the engine cross-head pin-strap, the pipe or duct 18, connected both with the crank-pin and the said pipe 16, and also supported on said cross-head pin-strap, and a branch pipe or duct, 19, conducting to the said cross-head pin, substantially as set forth.

6. The combination of the grease-cup 1, the pipe 4, the stationary joint 7, connecting said pipe 4 with pipe 14 and supporting same, the swing or vibrating joint 15, the connecting-pipes 14 and 16, the stationary joint 7, adapted to be fixed to the engine cross-head pin-strap connecting and supporting pipes 16 18, and the branch pipe or duct 20 from pipe 18, all arranged and adapted to operate substantially as and for the purposes set forth.

7. The combination of grease-cup 1, jointed pipes 14 and 16, connected thereto and supported on cross-head 17, pipe 18, connected with the crank-pin and the pipe 16, and also supported on said cross-head pin-strap, and a branch pipe, 19, connected with the cross-head pin, substantially as set forth.

8. The combination of grease-cup 1, pipe 4, stationary joint 7, connecting said pipe 4 with pipe 14 and supporting same, swing-joint 15, connecting-pipes 14 and 16, stationary joint 7', adapted to be fixed to cross-head pin-strap 17, and connecting and supporting pipes 16 and 18.

9. The combination of a stationary grease-cup, 1, having pipe 4 connected therewith, a stationary hollow joint, 7, to which said pipe is connected, the pipe 14, hinged to said joint and having connection therethrough with pipe 4, the pipe 16, connected to pipe 14 by a hollow hinged joint at one end, and having at its other end connection with a pipe, 18, by a hinged joint adapted to be mounted on the cross-head pin-strap of said engine, substantially as set forth.

HENRY O'CONNELL.
STEPHEN A. CAHILL.

Witnesses:
LOUIS DOELLE,
PETER A. YOSE.